(12) United States Patent
McClelland

(10) Patent No.: US 12,241,774 B2
(45) Date of Patent: Mar. 4, 2025

(54) CALIBRATION SYSTEM FOR AN AGRICULTURAL CROP YIELD MONITOR

(71) Applicant: CNH Industrial America LLC, New Holland, PA (US)

(72) Inventor: Brett McClelland, Chicago, IL (US)

( * ) Notice: Subject to any disclaimer, the term of this patent is extended or adjusted under 35 U.S.C. 154(b) by 403 days.

(21) Appl. No.: 17/591,790

(22) Filed: Feb. 3, 2022

(65) Prior Publication Data

US 2023/0243693 A1 Aug. 3, 2023

(51) Int. Cl.
| | | |
|---|---|---|
| *G01G 23/01* | (2006.01) | |
| *A01D 41/127* | (2006.01) | |
| *A01D 90/10* | (2006.01) | |
| *G01G 17/00* | (2006.01) | |
| *G01G 19/08* | (2006.01) | |

(52) U.S. Cl.
CPC .......... *G01G 23/01* (2013.01); *A01D 41/127* (2013.01); *A01D 90/10* (2013.01); *G01G 17/00* (2013.01); *G01G 19/08* (2013.01)

(58) Field of Classification Search
CPC ........ G01G 23/01; G01G 19/08; G01G 19/12; G01G 17/00; A01D 41/1271; A01D 90/10; A01D 41/1277; A01D 41/127
See application file for complete search history.

(56) References Cited

U.S. PATENT DOCUMENTS

| | | | | |
|---|---|---|---|---|
| 7,507,917 | B2* | 3/2009 | Kaltenheuser | A01D 41/12 177/136 |
| 10,126,282 | B2* | 11/2018 | Anderson | A01D 41/1271 |
| 10,188,037 | B2* | 1/2019 | Bruns | A01D 41/1273 |
| 10,317,272 | B2* | 6/2019 | Bhavsar | A01D 41/1272 |
| 10,809,118 | B1* | 10/2020 | Von Muenster | G01G 11/003 |
| 11,946,747 | B2* | 4/2024 | Vandike | A01B 79/005 |
| 2016/0084813 | A1* | 3/2016 | Anderson | G01N 33/025 702/5 |
| 2016/0345485 | A1* | 12/2016 | Acheson | A01B 79/005 |
| 2019/0335650 | A1* | 11/2019 | Le Brech | A01D 46/28 |
| 2024/0065156 | A1* | 2/2024 | Woodcock | A01D 41/1277 |

FOREIGN PATENT DOCUMENTS

| | | | | |
|---|---|---|---|---|
| CN | 105875030 A | * | 8/2016 | ......... A01D 41/1271 |
| EP | 2654396 B1 | * | 4/2018 | ......... A01D 41/1271 |

* cited by examiner

*Primary Examiner* — Octavia Hollington
(74) *Attorney, Agent, or Firm* — Rickard K. DeMille; Rebecca L. Henkel; Peter K. Zacharias

(57) ABSTRACT

A method for facilitating calibration of a yield monitor, including receiving, via a controller of a yield monitor calibration system, a first signal indicative of a first weight value from a scale of the yield monitor calibration system, wherein the scale is configured to monitor weight of harvested crops in a mobile storage compartment configured to receive the harvested crops from a harvester during an unloading operation. The method also includes receiving, via the controller, a second signal indicative of a second weight value from the scale in response to receiving a third signal indicative of the harvester completing the unloading operation, comparing, via the controller, the first weight value to the second weight value to determine a difference value, as well as outputting, via the controller, the difference value to the yield monitor to enable the yield monitor to perform a calibration process.

18 Claims, 5 Drawing Sheets

CALIBRATION SYSTEM FOR AN AGRICULTURAL CROP YIELD MONITOR

BACKGROUND

The present disclosure generally relates to a calibration system for an agricultural crop yield monitor.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester (e.g., a combine, a harvester vehicle, etc.) may harvest crops in a field throughout a day, filling a hopper with harvested crops. To facilitate continuous operation of the harvester, the harvester may periodically unload harvested crops from the hopper to a transport vehicle, and the transport vehicle may transport the harvested crops to a location for storage or shipping. The harvester may monitor a quantity of harvested crops using a yield monitor. The yield monitor may be an optical system used to estimate an amount of harvested crops the harvester has harvested. The yield monitor is periodically calibrated to maintain estimation accuracy. The calibration process includes manually weighing the harvested crops and then manually entering the weight of the harvested crops into the yield monitor. Unfortunately, manual calibration may be time consuming and labor intensive.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a method for facilitating calibration of a yield monitor includes receiving, via a controller of a yield monitor calibration system, a first signal indicative of a first weight value from a scale of the yield monitor calibration system, wherein the scale is configured to monitor weight of harvested crops in a mobile storage compartment configured to receive the harvested crops from a harvester during an unloading operation. The method also includes receiving, via the controller, a second signal indicative of a second weight value from the scale in response to receiving a third signal indicative of the harvester completing the unloading operation, comparing, via the controller, the first weight value to the second weight value to determine a difference value, as well as outputting, via the controller, the difference value to the yield monitor to enable the yield monitor to perform a calibration process.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
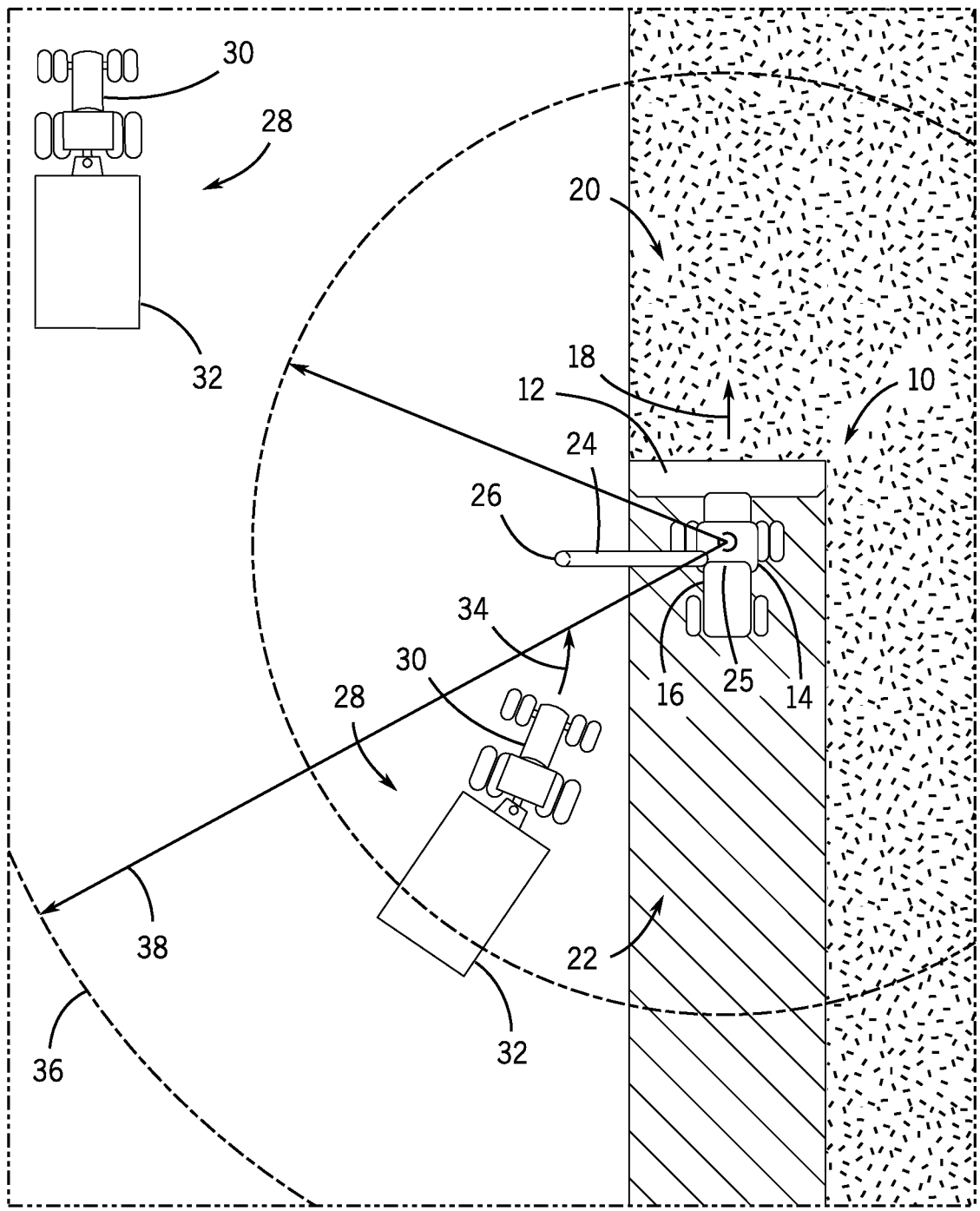
FIG. 1 is a top view of an embodiment of a harvester and an agricultural product transportation system, in which the agricultural product transportation system is configured to receive harvested crops from the harvester, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Harvesters (e.g., combines) are an integral part of agricultural harvesting operations. Harvesters may utilize one or more harvesting implements (e.g., within a header) and/or one or more processing tools to separate desirable portions of crops (e.g., harvested crops) from stalks, roots, and other undesirable portions of crops. Once the harvested crops are harvested, mechanisms of the harvester (e.g., conveyors, sorters, etc.) deposit the harvested crops into a storage receptacle (e.g., a hopper). Space in the hopper is limited, and after a certain period of time, the hopper may become full. To enable the harvester to continue the harvesting operation, the harvester may unload the harvested crops from the hopper via a conveyor, an auger, or the like. A transportation vehicle may travel alongside the moving harvester and align a storage container with an outlet of the conveyor/auger. The conveyor/auger may unload the contents of the hopper into the storage container as the harvester and transportation vehicle move through the field. The harvested crops within the storage container may be subsequently unloaded at a location for storage or shipping. The transportation vehicle may then return to the harvester to facilitate additional unloading operations.

Certain harvesters include a yield monitor that informs a user of the harvester of a quantity of harvested crops that have been harvested. A yield monitor is a system that includes a controller and one or more sensors, and the controller is configured to estimate an estimated weight of harvested crops within the hopper during harvesting operations based on feedback from the sensor(s). For example, the sensor(s) may include optical sensor(s), and the controller may determine the estimated weight of the harvested crops within the hopper based on feedback from the optical sensor(s). A number of factors may decrease accuracy of the yield monitor. For example, changes in weather (e.g., humidity, rainfall, etc.) may alter the weight of harvested crops. Consequently, the yield monitor may produce an inaccurate weight estimate for the harvested crops. In order to increase the accuracy of the yield monitor, a user may perform a manual calibration operation. For example, the user may weigh a load of harvested crops collected by the storage container coupled to the transportation vehicle. The user may then manually enter the weight of the harvested crops into the yield monitor, thereby enabling the yield monitor to compare the weight of the harvested crops to the estimate and adjust calibration(s) accordingly. However, the manual calibration process may be labor intensive and time consuming. Accordingly, present embodiments are directed to a yield monitor calibration system that automatically calibrates a yield monitor throughout a harvesting operation.

With this in mind, FIG. 1 is a top view of an embodiment of a harvester and an agricultural product transportation system, in which the agricultural product transportation system is configured to receive harvested crops from the harvester. In the illustrated embodiment, a harvester 10 (e.g., an agricultural harvester, a combine, a harvest vehicle, etc.) includes a row of harvesting units 12 (e.g., forming a header) positioned on a front end of a chassis 14 and an internal storage compartment 16 (e.g., a hopper) coupled to the chassis 14. As the harvester 10 traverses a field along a direction of travel 18, the harvesting units 12 engage unharvested plants 20 and extract various agricultural products (e.g., corn, wheat, cotton, etc.) from the plants. These agricultural products (e.g., harvested crops) are transferred to the internal storage compartment 16, either directly or via a processing device configured to remove undesirable portions of the plants. The remaining portions of the plants are distributed to the field as agricultural residue 22.

As the harvester 10 traverses the field, the volume of agricultural product stored within the internal storage compartment 16 increases. Accordingly, the harvester 10 includes a conveyor 24 configured to transfer the agricultural product to a mobile storage compartment while the harvester is in motion. The conveyor 24 may include an auger, a conveyor belt, or another suitable device configured to transfer the agricultural product (e.g., harvested crops) from the internal storage compartment 16 to a conveyor outlet 26. In certain embodiments, the mobile storage compartment may be automatically aligned with the conveyor outlet 26, thereby enhancing the efficiency of the harvester unloading process. While the illustrated harvester 10 is a self-propelled vehicle, in certain embodiments, the harvester may be towed behind a tractor or other work vehicle. In addition, while the illustrated harvester 10 includes an internal storage compartment 16, the internal storage compartment may be omitted in certain harvester configurations. In such configurations, the harvester may continuously transfer agricultural product to the mobile storage compartment as the harvester harvests the agricultural products.

In the illustrated embodiment, an agricultural product transportation system 28 is configured to receive the agricultural product from the harvester 10. As illustrated, the agricultural product transportation system 28 includes a haul vehicle 30 (e.g., a work vehicle, a transportation vehicle, etc.), such as the illustrated tractor, and a mobile storage compartment 32 (e.g., grain cart). In certain embodiments, the haul vehicle 30 includes a controller configured to automatically direct the haul vehicle along a route 34 to a target position proximate to the harvester 10. For example, the controller may automatically control the haul vehicle 30 during a docking process, thereby positioning the storage compartment in a location that enhances the transfer efficiency of the agricultural product from the harvester to the storage compartment. The controller may also automatically maintain the position of the storage compartment relative to the conveyor outlet during the unloading process, thereby substantially reducing or eliminating agricultural product loss, which increases the efficiency of the harvesting process. While the storage compartment 32 is towed by the haul vehicle 30 in the illustrated embodiment, in other embodiments, the storage compartment may be rigidly coupled to the haul vehicle (e.g., such that the storage compartment forms a portion of the haul vehicle).

By way of example, when the haul vehicle 30 enters an area of communication 36, communication is automatically established between a first transceiver on the haul vehicle 30 and a second transceiver on the harvester 10. The controller of the haul vehicle detects the harvester upon receiving a signal from the harvester transceiver, and the controller of the harvester detects the haul vehicle upon receiving a signal from the haul vehicle transceiver. A range 38 of the area of communication 36 may be dependent on the broadcast power of the transceivers, the sensitivity of the transceivers, the communication frequency, other suitable factor(s), or a combination thereof. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). The data may include a location of the haul vehicle/harvester, a speed of the haul vehicle/harvester, a heading of the haul vehicle/harvester, an identity of the haul vehicle/harvester, other parameter(s), or a combination thereof. In addition, each transceiver may be configured to retransmit data received from another transceiver. For example, the haul vehicle closer to the harvester may receive a signal from the harvester, and then retransmit the signal to the haul vehicle farther from the harvester, thereby effectively extending the communication range of each transceiver.

To initiate the docking process, the controller of the haul vehicle 30 determines a path that the harvester traverses, generates a path for the haul vehicle 30 to follow, and controls the haul vehicle 30 to follow the path to align the storage compartment 32 with the conveyor outlet 26. The controller also automatically maintains the position of the storage compartment relative to the conveyor outlet during the unloading process. In certain embodiments, an operator may manually initiate the docking process.

Having received a load of harvested crops from the harvester 10 via the conveyor 24, the haul vehicle 30 of the agricultural product transportation system 28 may transport the harvested crops to a secondary location. The secondary location may be a storage location (e.g., a silo), a shipping location, or the like. The haul vehicle 30 may unload the harvested crop at the secondary location via an unloading apparatus, worker labor, or both. Once unloaded, the haul vehicle 30 may return to the harvester 10 to enable the storage compartment 32 to receive more harvested crops.

During a harvesting operation, a yield monitor of the harvester 10 may estimate a quantity (e.g., weight) of harvested crops that are harvested.

Figure 2:
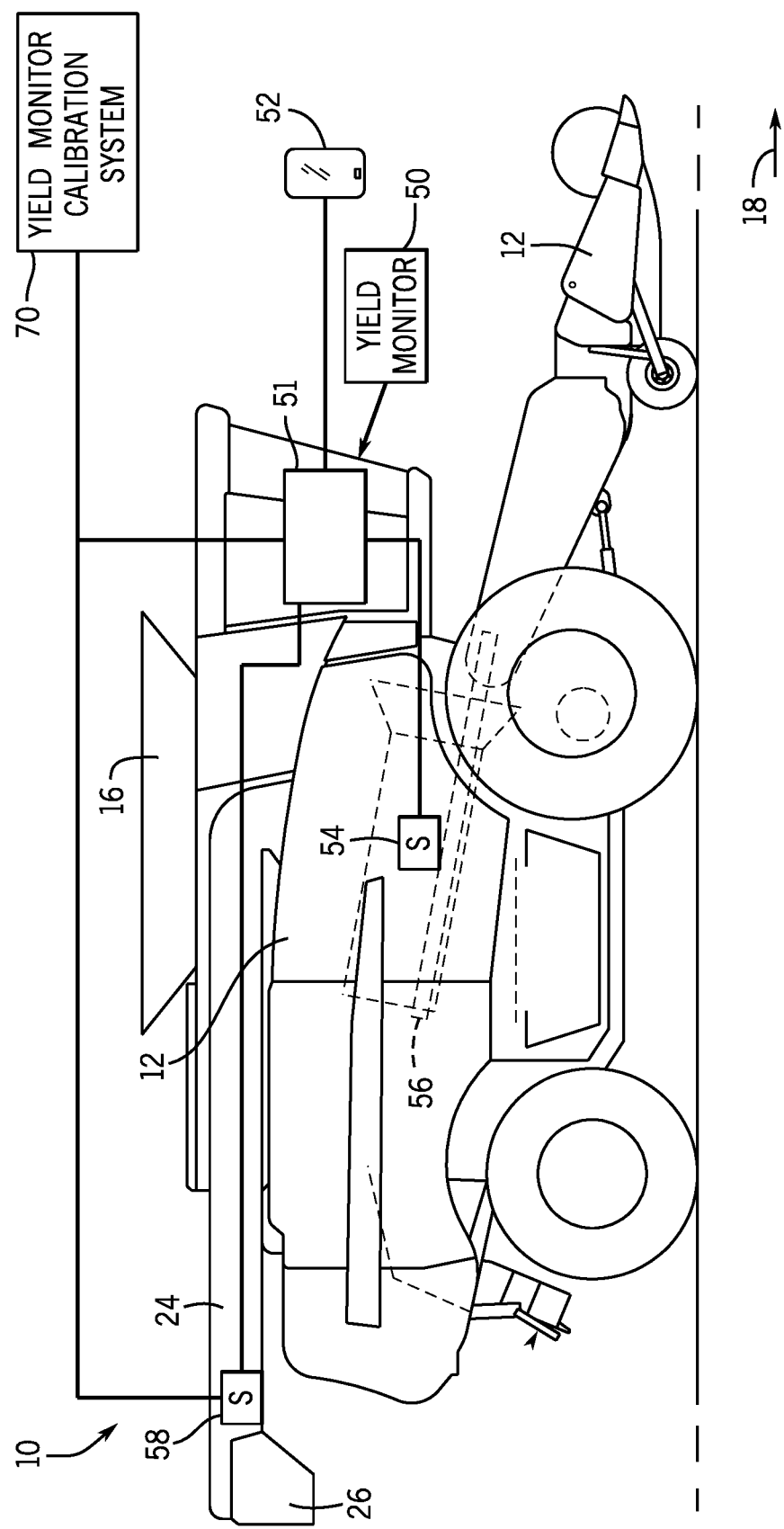
FIG. 2 is a side view of the harvester of FIG. 1, in accordance with an aspect of the present disclosure.

FIG. 2 is a side view of the harvester 10 of FIG. 1, in which the harvester includes a yield monitor. In the illustrated embodiment, the harvester 10 includes a yield monitor 50. The yield monitor 50 may receive data and analyze the data to determine an estimate of a weight of crop harvested by the harvester 10. Additionally, the yield monitor 50 may analyze moisture data to increase estimate accuracy. In certain embodiments, the yield monitor 50 may determine an estimate of a weight of crops harvested over a period of time (e.g., kilograms of harvested crops per hour, pounds of crops harvested per second, etc.). In other embodiments, the yield monitor 50 may determine an estimate of a weight of crops harvested as the harvester 10 harvests a certain area of the field (e.g., kilograms of harvested crops per hectare, pounds of harvested crops per acre, etc.). For example, the yield monitor may determine an area (e.g., a number of acres, etc.) harvested by multiplying a distance travelled by a width of the harvesting units 12 (e.g., header). Once the yield monitor 50 determines the estimate of the weight of harvested crops (e.g., per area, per time, etc.), the yield monitor 50 may output the estimate to a remote device 52. In certain embodiments, the remote device may include a computer, a phone, a tablet, or another suitable device. Additionally or alternatively, the yield monitor may output the estimate to a user interface of the harvester. An operator of the harvester 10 may utilize the estimate to make adjustments to a path traveled by the harvester, a speed of the harvester, a position of the header, other suitable parameter(s), or a combination thereof. For example, if the estimate indicates that the harvester 10 is harvesting a certain amount of crops per area, the operator may adjust a total distance of a harvesting path, thereby harvesting a certain quantity of harvested crops. Furthermore, in certain embodiments, the remote device 52 may be positioned on the haul vehicle 30. In such embodiments, an operator of the haul vehicle may utilize the estimate to plan an unloading operation. For example, the operator may utilize the estimate to determine when to dock with the harvester 10 (e.g., at a time in which the internal storage compartment 16 is filled by harvested crops).

A controller 51 of the yield monitor 50 may determine the estimate based on data received from one or more sensors 54 of the yield monitor, which are installed on the harvester 10. The controller 51 of the yield monitor 50 may be communicatively coupled to the sensor(s) 54, and the controller may analyze the data received from the sensor(s) 54 to determine a weight estimate of the harvested crops. In certain embodiments, the sensor(s) 54 may include one or more optical sensors (e.g., camera(s), light detection and ranging (LiDAR) sensor(s), etc.). The optical sensor(s) may be located within an interior of the harvester and may output a signal indicative of data associated with the harvested crops being transported by an internal conveyor 56 of the harvester 10. For example, the optical sensor(s) may monitor a profile of the harvested crops and/or a speed of the harvested crops. The controller 51 may determine the weight estimate of the harvested crops based on the profile and/or the speed of the harvested crops at the internal conveyor. Additionally or alternatively, the sensor(s) 54 may include one or more pressure sensors. The internal conveyor may direct the harvested crops toward the pressure sensor(s), which monitor pressure data corresponding to impacts of the harvested crops with the pressure sensor(s). The controller 51 of the yield monitor 50 may analyze the pressure data received from the pressure sensor(s) to determine a weight estimate of the harvested crops. The sensor(s) 54 may be located at a variety of different locations about the harvester 10. In some embodiments, the controller 51 of the yield monitor may receive data from multiple sensors at different locations on the harvester 10. For example, in certain embodiments, the controller 51 of the yield monitor may determine a separate weight estimate based on feedback from each sensor or each group of sensors and determine a resultant weight estimate based on a mean of the multiple estimates. The yield monitor may also include moisture sensor(s), temperature sensor(s) (e.g., thermocouple(s)), other suitable type(s) of sensor(s), or a combination thereof.

The harvester 10 may include a conveyor sensor 58 (e.g., an auger sensor) within the conveyor 24. The conveyor senor 58 may be disposed within the conveyor 24 to detect a quantity of harvested crops in the conveyor. For example, the conveyor sensor 58 may include an optical sensor, an ultrasonic sensor, a pressure sensor, an infrared sensor, a torque sensor, other suitable type(s) of sensor(s), or a combination thereof. In some embodiments, a controller (e.g., the controller 51 of the yield monitor, a controller of the yield monitor calibration system, etc.) may identify completion of an unloading operation based on feedback from the conveyor sensor 58. For example, during an unloading operation between the harvester 10 and the agricultural product transportation system, the controller may determine when the conveyor 24 completes unloading the internal storage compartment 16 based on feedback from the conveyor sensor 58. In certain embodiments, the conveyor sensor 58 may detect an absence of harvested crops in the conveyor 24, and, in response, the controller may determine that the conveyor 24 has emptied the internal storage compartment 16. Furthermore, in certain embodiments, the conveyor sensor 58 may detect that a quantity of harvested crops in the conveyor 24 is below a threshold value, and, in response, the controller may determine that the conveyor 24 has emptied the internal storage compartment 16. For example, an unloading operation may be performed while the harvester 10 is harvesting crops. As a result, the internal storage compartment 16, and consequently the conveyor 24, may receive a substantially continuous supply of harvested crops. Therefore, even after the unloading process is complete, harvested crops may continue to flow through the conveyor 24. However, the quantity of harvested crops flowing through the conveyor during the unloading process may be significantly greater than the quantity of harvested crops flowing through the conveyor after the unloading process is complete (e.g., while the harvester continues to harvest crops). Accordingly, the threshold value may correspond to the quantity of harvested crops flowing through the conveyor after the unloading process is complete. The conveyor sensor 58 may be communicatively coupled to the controller 51 of the yield monitor 50. Additionally or alternatively, the conveyor sensor 58 may be communicatively coupled to a controller of the yield monitor calibration system 70. In certain other embodiments, the harvester 10 may include a tank sensor to detect when the internal storage compartment 16 is empty.

Figure 3:
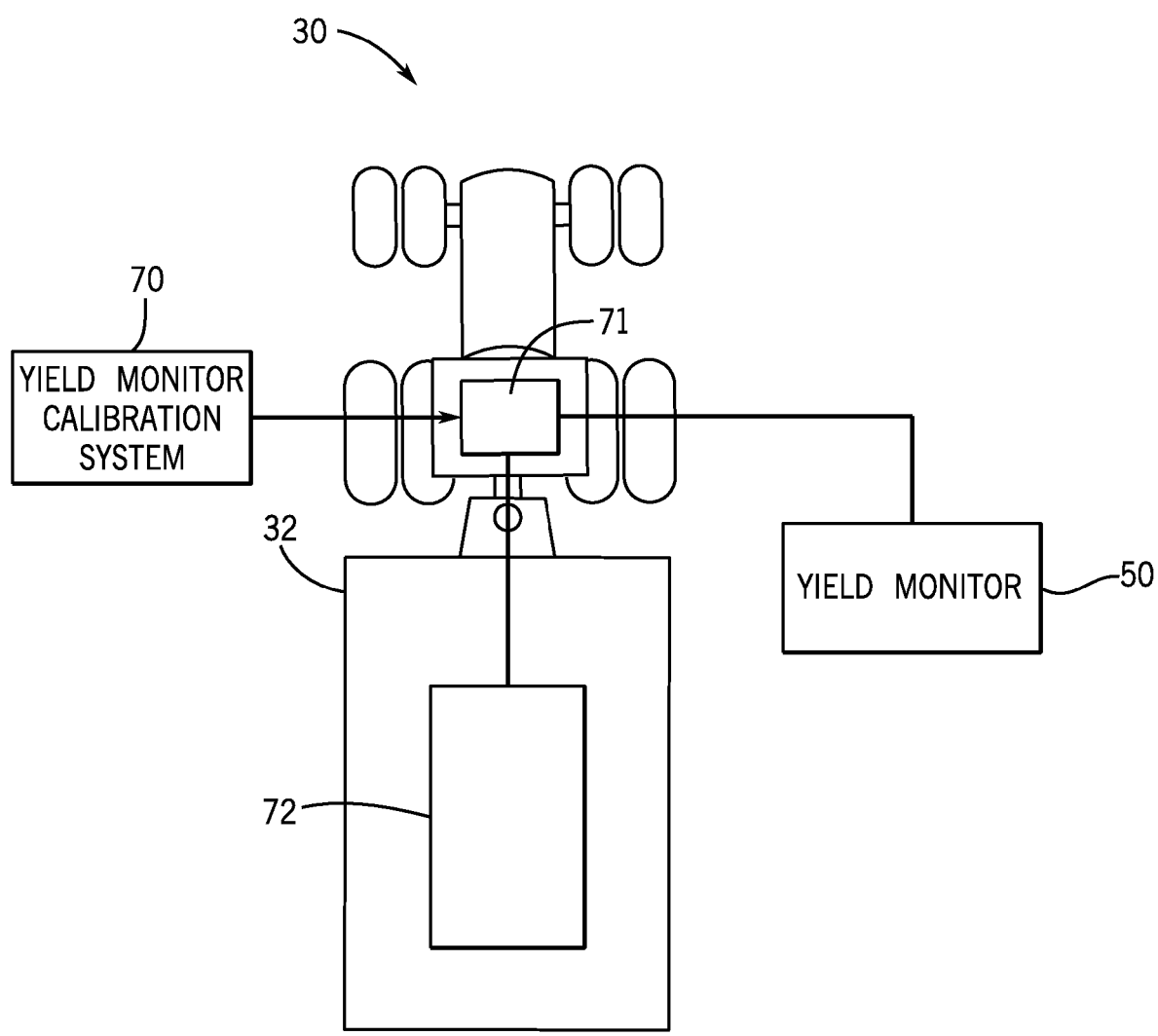
FIG. 3 is a top view of the agricultural product transportation system of FIG. 1, in accordance with an aspect of the present disclosure.

FIG. 3 is a top view of the agricultural product transportation system 28 of FIG. 1, in which the agricultural product transportation system includes the yield monitor calibration system 70. The yield monitor calibration system 70 may be configured to facilitate calibration of the yield monitor 50 during harvesting operations. To this end, the yield monitor calibration system 70 may be communicatively coupled to the yield monitor 50. Additionally, the yield monitor calibration system 70 includes a scale 72 and a controller 71, which are communicatively coupled to one another. The controller 71 may be disposed within a chassis of the haul vehicle 30, in a remote location, or the like. The scale 72 is coupled to the mobile storage compartment 32 and configured to measure (e.g., monitor) a weight of the harvested crops within the storage compartment 32 following an unloading operation. That is, the scale 72 may measure the weight of the harvested crops unloaded from the harvester 10 via the conveyor 24. Before the loading operation, the controller 71 of the yield monitor calibration system 70 may receive a first weight indicating a weight of crops, if any, in the mobile storage compartment before the unloading operation. For example, the first weight may be received in response to a determination that the haul vehicle coupled to the mobile storage compartment is docked with the harvester. Subsequently, the controller 71 of the yield monitor calibration system 70 may receive a second weight indicating a weight of crops in the mobile storage compartment after the unloading operation is complete. The controller 71 of the yield monitor calibration system 70 may utilize the first weight and the second weight to determine a measured weight of harvested crops that are harvested by the harvester 10 over a period of time or over an area of the field (e.g., length of a harvesting path). The controller 71 of the yield monitor calibration system may compare the measured weight to an estimate generated by the yield monitor 50. Based on a difference between the measured weight and the estimate, the controller of the yield monitor calibration system 70 may initiate a calibration operation for the yield monitor 50. For example, if the measured weight is greater than the estimates weight, the controller of the yield monitor calibration system 70 may send the measured weight to the yield monitor. In response, the yield monitor may adjust itself, such that the yield monitor generates estimates that are greater than previous estimates in proportion to the difference between the measured weight and the estimate.

Figure 4:
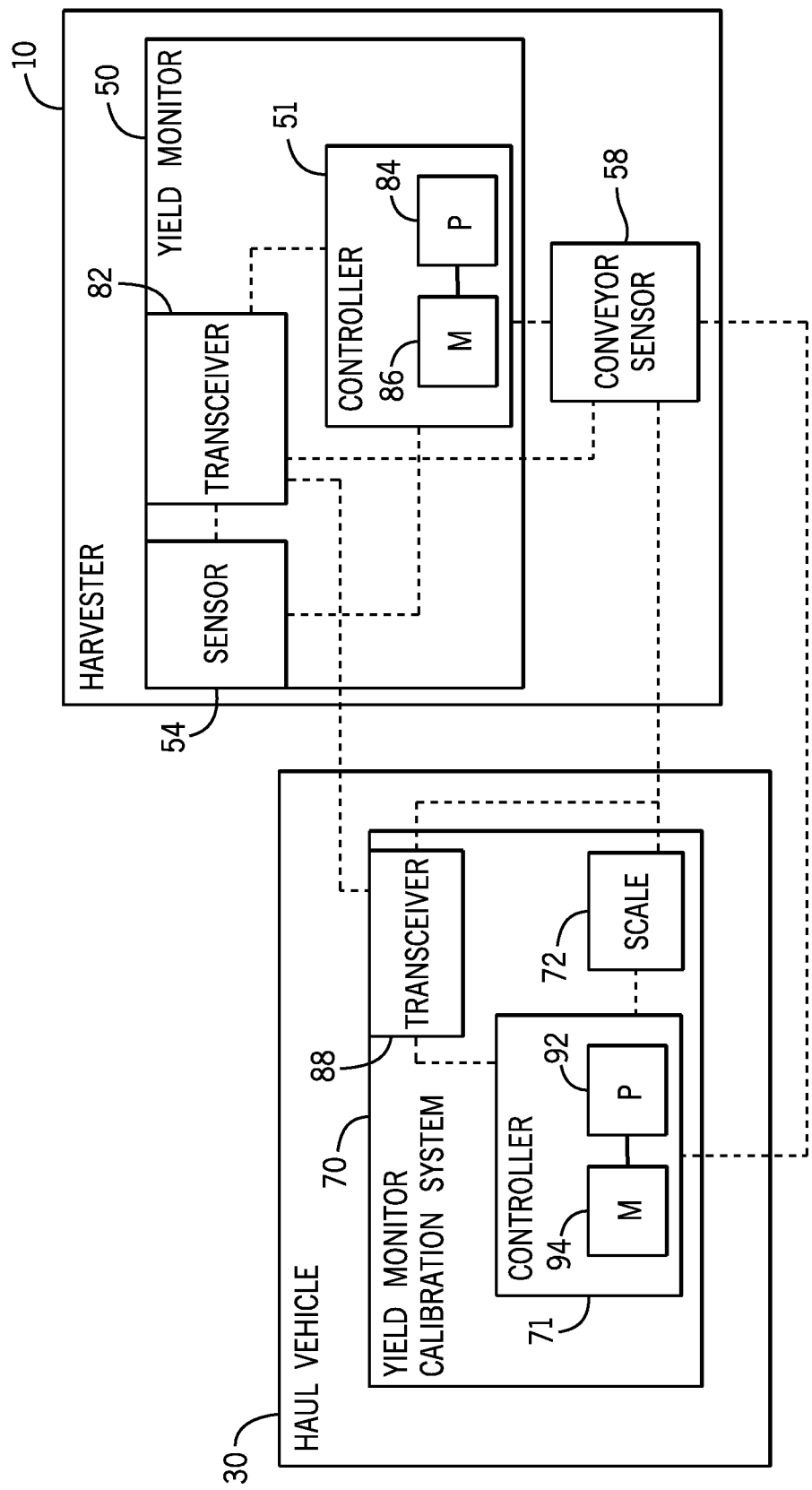
FIG. 4 is a block diagram of an embodiment of a yield monitor and an embodiment of a yield monitor calibration system, in accordance with an aspect of the present disclosure.

FIG. 4 is a block diagram of an embodiment of a yield monitor 50 and an embodiment of a yield monitor calibration system 70. As previously discussed, the yield monitor 50 includes a controller 51. In certain embodiments, the controller 51 is an electronic controller having electrical circuitry configured to process data from a first transceiver 82 of the yield monitor 50, the yield sensor(s) 54, the conveyor sensor 58, other component(s) included in the harvester 10, or a combination thereof. In the illustrated embodiment, the yield sensor(s) 54, the conveyor sensor 58, and the first transceiver 82 are communicatively coupled to the controller 51. Furthermore, the controller 51 includes a processor 84, such as the illustrated microprocessor, and a memory device 86. The controller 51 may also include one or more storage devices and/or other suitable components. The processor 84 may be used to execute software, such as software for controlling the yield monitor 50, and so forth. Moreover, the processor 84 may include multiple microprocessors, one or more "general-purpose" microprocessors, one or more special-purpose microprocessors, and/or one or more application specific integrated circuits (ASICS), or some combination thereof. For example, the processor 84 may include one or more reduced instruction set (RISC) processors.

The memory device 86 may include a volatile memory, such as random access memory (RAM), and/or a nonvolatile memory, such as read-only memory (ROM). The memory device 86 may store a variety of information and may be used for various purposes. For example, the memory device 86 may store processor-executable instructions (e.g., firmware or software) for the processor 84 to execute, such as instructions for controlling the yield monitor 50. The storage device(s) (e.g., nonvolatile storage) may include ROM, flash memory, a hard drive, or any other suitable optical, magnetic, or solid-state storage medium, or a combination thereof. The storage device(s) may store data (e.g., threshold value(s), calibration(s), etc.), instructions (e.g., software or firmware for controlling the yield monitor, etc.), and any other suitable data.

The first transceiver 82 is configured to output and receive signals from other transceivers. For example, the first transceiver 82 may receive a signal from a second transceiver 88 of the yield monitor calibration system 70. The signal may include data indicative of a measured weight, sensor data, or the like. The first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, cellular, etc.) or a proprietary protocol. In some embodiments, data may be communicated between the yield monitor 50, the yield monitor calibration system 70, and other systems via a cloud database.

Furthermore, as previously discussed, the yield monitor calibration system 70 includes a controller 71. In certain embodiments, the controller 71 is an electronic controller having electrical circuitry configured to process data from the second transceiver 88, the scale 72, the conveyor sensor 58, other component(s) included in the haul vehicle 30, or a combination thereof. In the illustrated embodiment, the scale 72, the conveyor sensor 58, and the second transceiver 88 are communicatively coupled to the controller 71. In addition, the controller 90 includes a processor 92, such as the illustrated microprocessor, and a memory device 94. The controller 71 may also include one or more storage devices and/or other suitable components. The processor 92 may be used to execute software, such as software for controlling the yield monitor calibration system 70, and so forth. Moreover, the processor 92 may include multiple microprocessors, one or more "general-purpose" microprocessors, one or more special-purpose microprocessors, and/or one or more application specific integrated circuits (ASICS), or some combination thereof. For example, the processor 92 may include one or more reduced instruction set (RISC) processors.

The memory device 94 may include a volatile memory, such as random access memory (RAM), and/or a nonvolatile memory, such as read-only memory (ROM). The memory device 94 may store a variety of information and may be used for various purposes. For example, the memory device 94 may store processor-executable instructions (e.g., firmware or software) for the processor 92 to execute, such as instructions for controlling the yield monitor calibration system 70. The storage device(s) (e.g., nonvolatile storage) may include ROM, flash memory, a hard drive, or any other suitable optical, magnetic, or solid-state storage medium, or a combination thereof. The storage device(s) may store data (e.g., weight data, etc.), instructions (e.g., software or firmware for controlling the yield monitor calibration system, etc.), and any other suitable data. The components of FIG. 4 may work together to control a calibration operation during harvesting operations, as described below. While the conveyor sensor 58 is communicatively coupled to both the controller 51 of the yield monitor 50 and the controller 71 of the yield monitor calibration system 70, in other embodiments, the conveyor sensor may be communicatively coupled to one controller, and the data may be transferred to the other controller via the transceiver 82 and the transceiver 88.

Figure 5:
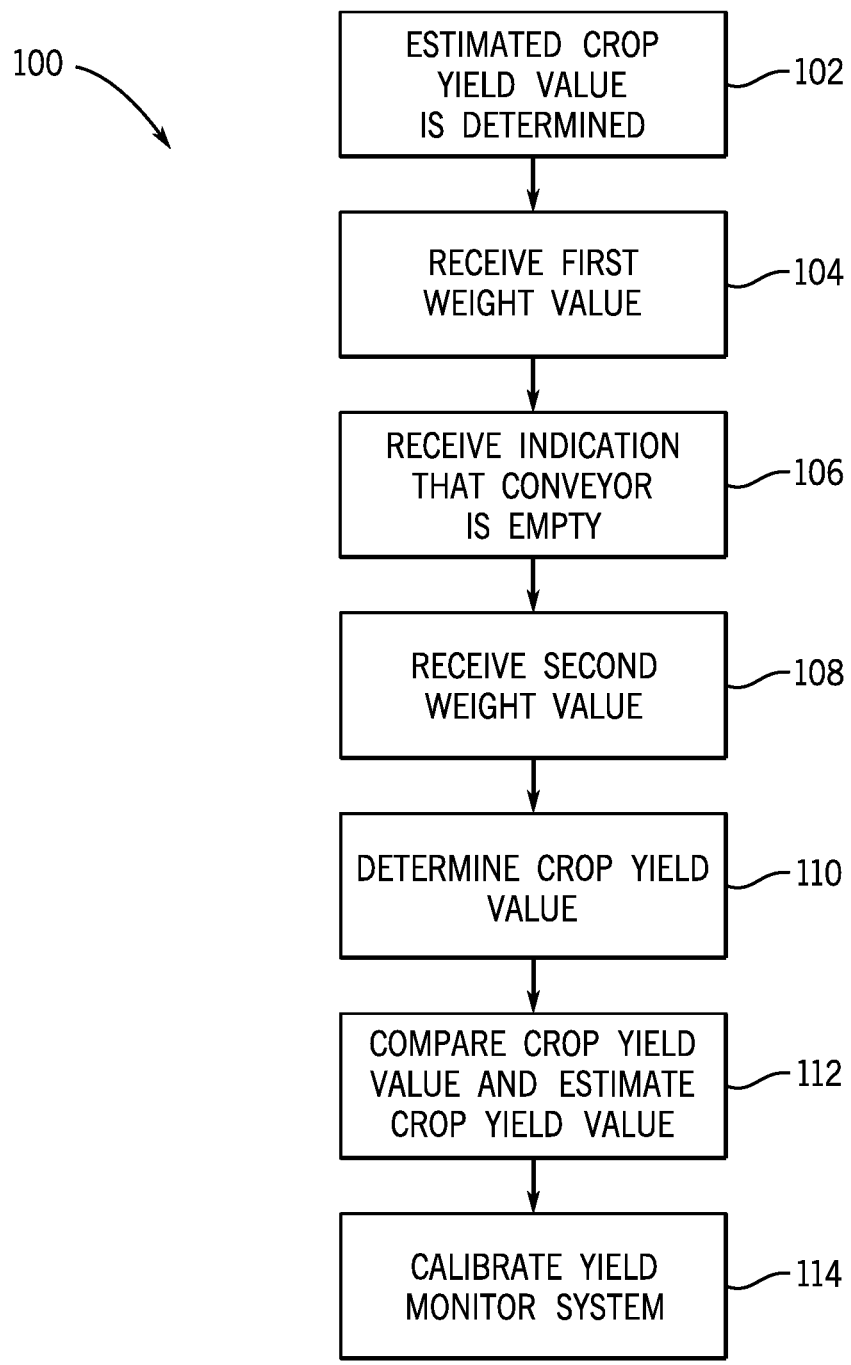
FIG. 5 is a flow diagram of an embodiment of a method for calibrating the yield monitor, in accordance with an aspect of the present disclosure.

FIG. 5 is a flow diagram of an embodiment of a method 100 for calibrating the yield monitor. The method 100 may be performed via the yield monitor calibration system controller and/or the yield monitor controller disclosed above, or the method may be performed by other suitable device(s). Further, the method 100 may be performed differently in additional or alternative embodiments. For instance, additional steps may be performed with respect to the method 100, and/or certain steps of the method 100 may be modified, removed, performed in a different order, or a combination thereof. The method 100 may be performed once per time period (e.g., day, week, month, etc.), once per unloading operation, or the like.

At block 102, a crop yield estimate (e.g., a crop yield estimate value) is determined. The crop yield estimate may be determined by the yield monitor controller. As previously discussed, the yield monitor controller may determine the crop yield estimate based on data received from the yield sensor(s) installed in the harvester. For example, in some embodiments, the yield monitor controller may analyze optical data received from optical sensor(s). The optical data may be analyzed to determine profile data, which may be analyzed to determine a volume estimate. Subsequently, the volume estimate may be analyzed alongside crop density data to determine a weight estimate. The yield monitor controller may determine a crop yield estimate of a weight of harvested crops harvested over a certain time period (e.g., a harvest rate), a weight of crops harvested over a certain harvested area of a field, or the like.

In some embodiments, the crop yield estimate may be determined in response to the yield monitor controller and/or the yield monitor calibration system controller detecting the agricultural product transportation system within a threshold distance of the harvester. For example, the first transceiver of the yield monitor may receive data from the second transceiver of the yield monitor calibration system indicating that the agricultural product transportation system is within a threshold distance of the harvester. In another embodiment, the yield monitor calibration system controller may determine that the agricultural product transportation system is travelling along a path adjacent to a path of travel of the harvester (e.g., initiating a docking operation). In response to the proximity of the agricultural product transportation system to the harvester, the yield monitor controller may determine the crop yield estimate. In certain embodiments, the crop yield estimate may be an estimate of a weight of harvested crops (e.g., agricultural product) harvested during an interval between an end of a previous unloading operation and a beginning of a current unloading operation. In some embodiments, the crop yield estimate may be substantially continuously/periodically updated as the harvester harvests crops (e.g., including during the current unloading operation). The yield monitor system may cease updating the crop yield estimate at an end of the unloading operation.

At block 104, a first weight value is received (e.g., by the yield monitor calibration system controller). The first weight may be measured by the scale of the mobile storage compartment. The first weight represents an initial weight of harvested crops or other contents stored in the mobile storage compartment at the start of an unloading operation. For example, the agricultural product transportation system may dock with the harvester after unloading contents of the mobile storage compartment at a storage location (e.g., and before performing another unloading operation with another harvester). Accordingly, the first weight may be substantially zero. In another example, the agricultural product transportation system may participate in an unloading operation (e.g., a second unloading operation) following another unloading operation (e.g., a first unloading operation). Accordingly, the first weight may be a positive, nonzero value. After receiving the first weight, the unloading operation may be performed (e.g., automatically via a harvester controller, such as the yield monitor controller). The conveyor may empty the contents of the internal storage compartment (e.g., the hopper) into the mobile storage compartment of the agricultural product transportation system. The unloading operation may continue until the hopper is empty. The unloading operation may begin in response to an indication that the haul vehicle has successfully docked with the harvester.

At block 106, an indication that the conveyor is empty is received (e.g., by the yield monitor calibration system controller). For example, the conveyor sensor may output a signal indicative of the conveyor being empty (e.g., the contents of the conveyor being below a threshold value). In certain embodiments, the conveyor sensor may include an optical sensor. In such embodiments, the yield monitor calibration system controller may determine whether the conveyor is empty based on optical data indicating the presence/absence of harvested crops. Furthermore in certain embodiments, the conveyor sensor may include a torque sensor. In such embodiments, the yield monitor calibration system controller may determine the presence of harvested crops in the conveyor based on torque data from the torque sensor. For example, an auger or a conveyor belt may experience high torque while the auger/conveyor belt is transporting a larger volume of harvested crops. However, the auger/conveyor belt may experience low torque while the auger/conveyor belt is transporting a smaller volume of harvested crops. For example, in certain embodiments, the yield monitor calibration system controller may determine the conveyor is empty in response to feedback from the conveyor sensor indicative of no harvested crops (e.g., no large harvested crop portions) in the conveyor. The controller may still determine that the conveyor is empty if the conveyor sensor indicates the presence of crop fragments (e.g., stalks, corn husks, chaff, etc.) in the conveyor. Furthermore, in certain embodiments, the yield monitor calibration system controller may determine that the conveyor is empty if less than a threshold quantity of harvested crops is present within the conveyor. For example, at the beginning of an unloading process, the conveyor may transport a certain quantity of harvested crops. However, once the internal storage compartment is substantially emptied, the conveyor may still receive and transport a smaller quantity of harvested crops at a rate at which the harvester harvests crops during a concurrent harvesting operation (e.g., concurrent with the unloading operation). In addition, in certain embodiments, the yield monitor calibration system controller may determine that the conveyor is empty if less than a threshold quantity of harvested crops is in the conveyor over a threshold period of time. For example, the yield monitor calibration system controller may determine that the conveyor is empty in response to detecting fewer than ten ears of corn in the conveyor over a period of one minute. Determining the conveyor is empty may serve as an indication that the unloading process is complete.

At block 108, a second weight value is received (e.g., by the yield monitor calibration system controller). The second weight may be measured in response to the indication that the conveyor is empty. The second weight may be measured by the scale, and may represent the final weight of harvested crops stored in the mobile storage compartment of the agricultural product transportation system following the unloading operation. The second weight may not be the total weight of harvested crop unloaded during the unloading operation. To determine the total weight, the yield monitor calibration system may perform analysis described at block 110.

At block 110, a measured weight value (e.g., a crop yield value) is determined. The measured weight value is the weight of harvested crops transferred from the internal storage compartment of the harvester to the mobile storage compartment during the unloading operation. Additionally, the measured weight is the weight of the crops harvested by the harvester during a period/over an area. The measured weight value may be determined by subtracting the first weight value from the second weight value. The measured weight value may be divided by the time period to generate a rate. Alternatively, the measured weight value may be divided by the harvested area of the field.

At block 112, the measured weight value and the crop yield estimate are compared. The yield monitor controller may determine a difference value between the measured weight value and the crop yield estimate. For example, the measured weight value may be 100 kilograms, while the crop yield estimate may be 105 kilograms. In one embodiment, the difference value may be a ratio of weight to acres (e.g., a lot of land). In another embodiment, the difference value may be a rate of weight over time. For example, a true weight value of one thousand kilograms per acre may be compared to a crop yield estimate of nine hundred kilograms per acre. In this example, the difference value is one hundred kilograms per acre, or approximately a one hundred and eleven percent difference.

At block 114, the yield monitor is calibrated based on the comparison between the measure weight value and the crop yield estimate. The yield monitor may be adjusted to record higher crop yield estimates if the measured weight value is higher than the crop yield estimate. Additionally, the yield monitor may be adjusted to record lower crop yield estimates if the measured weight value is lower than the crop yield estimate. For example, if the measured weight is 10 percent higher than the estimate value, the yield monitor calibration may be adjusted such that the crop yield estimates are 10 percent higher than previous crop yield estimates. In certain embodiments, once the calibration process is complete, the yield monitor controller may output a signal to a user interface indicating that the yield monitor is calibrated, and the user interface may present the indication to the operator.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for facilitating calibration of a yield monitor, comprising:
receiving, via a controller of a yield monitor calibration system, a first signal indicative of a first weight value from a scale of the yield monitor calibration system, wherein the scale is configured to monitor weight of harvested crops in a mobile storage compartment configured to receive the harvested crops from a harvester during an unloading operation, and the first signal is received in response to a determination that a haul vehicle coupled to the mobile storage compartment is docked with the harvester;
receiving, via the controller, a second signal indicative of a second weight value from the scale in response to receiving a third signal indicative of the harvester completing the unloading operation;
comparing, via the controller, the first weight value to the second weight value to determine a difference value; and
outputting, via the controller, the difference value to the yield monitor to enable the yield monitor to perform a calibration process.

2. The method of claim 1, wherein the third signal is output by a conveyor sensor and is indicative of a conveyor of the harvester being empty.

3. The method of claim 2, wherein the conveyor sensor comprises a torque sensor configured to monitor a torque on an auger or a conveyor belt within the conveyor.

4. The method of claim 2, wherein the conveyor sensor comprises an optical sensor configured to monitor the harvested crops.

5. The method of claim 1, wherein the yield monitor comprises an optical sensor disposed within a chassis of the harvester.

6. The method of claim 1, comprising outputting a fourth signal to a user interface of the harvester, to a remote device, or a combination thereof, wherein the fourth signal is indicative of the difference value.

7. An agricultural system, comprising:
a harvester configured to harvest crops in a field, wherein the harvester comprises:
a hopper configured to store the harvested crops;
a conveyor configured to unload the harvested crops from the hopper; and
a yield monitor configured to estimate a quantity of the harvested crops over an area of the field;
an agricultural product transportation system configured to transport harvested crop from the harvester to a location, wherein the agricultural product transportation system comprises a scale configured to measure a weight of the harvested crops within a mobile storage compartment of the agricultural product transportation system; and
a yield monitor calibration system comprising a controller, wherein the controller is configured to:
receive a first signal indicative of a first weight value from the scale of the agricultural product transportation system, wherein the first signal is received in response to a determination that a haul vehicle coupled to the mobile storage compartment is docked with the harvester;
receive a second signal indicative of a second weight value from the scale of the agricultural product transportation system in response to receiving a third signal indicative of the harvester completing an unloading operation;

compare the first weight value to the second weight value to determine a difference value; and output the difference value to the yield monitor to enable the yield monitor to perform a calibration process.

8. The agricultural system of claim 7, wherein the yield monitor comprises a controller configured to perform the calibration process based on the difference value received from the yield monitor calibration system.

9. The agricultural system of claim 7, wherein the third signal is output by a conveyor sensor of the conveyor and is indicative of the conveyor of the harvester being empty.

10. The agricultural system of claim 9, wherein the conveyor sensor comprises a torque sensor configured to monitor a torque on an auger or a conveyor belt of the conveyor.

11. The agricultural system of claim 10, wherein the third signal is indicative of the torque generated by the conveyor being zero.

12. The agricultural system of claim 9, wherein the conveyor sensor comprises an optical sensor configured to monitor the harvested crops.

13. The agricultural system of claim 7, wherein the yield monitor comprises a sensor configured to capture data regarding the harvested crops harvested by the harvester.

14. The agricultural system of claim 13, wherein the sensor is an optical sensor.

15. A yield monitor calibration system for an agricultural harvesting operation, wherein the yield monitor calibration system comprises a controller configured to:

receive a second first signal indicative of a first weight value from a scale of the yield monitor calibration system, wherein the scale is configured to monitor weight of harvested crops in a mobile storage compartment configured to receive the harvested crops from a harvester during an unloading operation, and the first signal is received in response to a determination that a haul vehicle coupled to the mobile storage compartment is docked with the harvester;

receive a second signal indicative of a second weight value from the scale;

compare the first weight value to the second weight value to determine a difference value; and send the difference value to a yield monitor to enable the yield monitor to perform a calibration process.

16. The yield monitor calibration system of claim 15, wherein the yield monitor comprises one or more processors configured to perform the calibration process in response to receiving the difference value.

17. The yield monitor calibration system of claim 15, wherein the difference value is a weight of crops harvested over an area.

18. The yield monitor calibration system of claim 15, wherein the the controller is configured to send a third signal comprising an indication to a device associated with a driver of the harvester, wherein the indication comprises the difference value.

* * * * *